June 21, 1960 J. H. McGUIGAN 2,942,241
MAGNETIC CORE SHIFT REGISTER CIRCUITS
Filed May 29, 1956
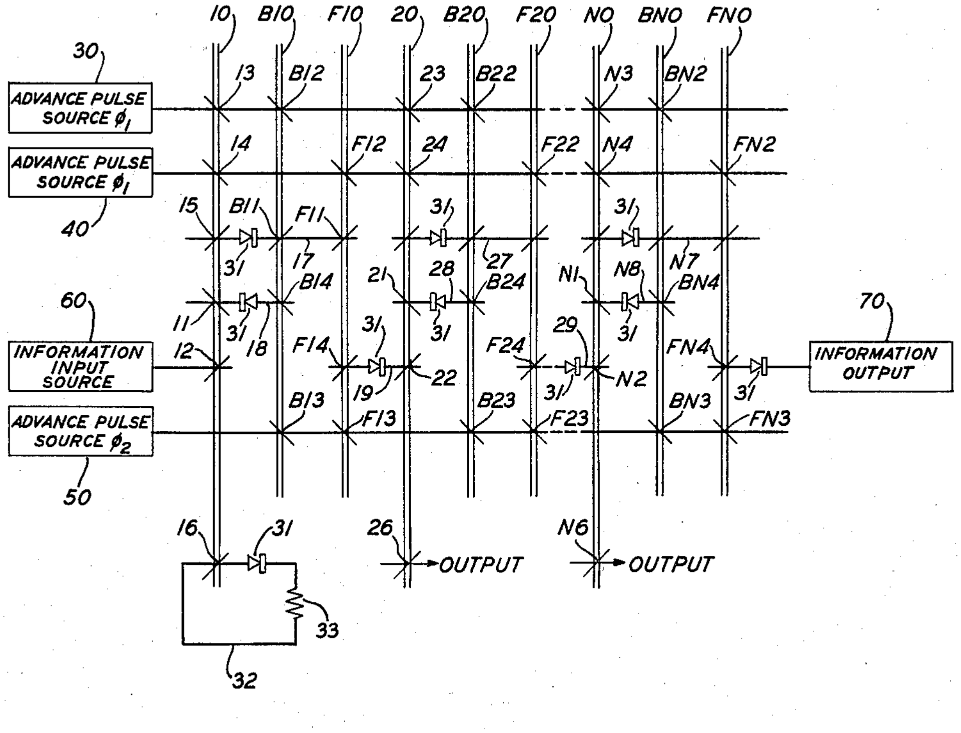
INVENTOR
J. H. McGUIGAN
BY James W. Falk
ATTORNEY United States Patent Office
2,942,241
Patented June 21, 1960

2,942,241

MAGNETIC CORE SHIFT REGISTER CIRCUITS

John H. McGuigan, New Providence, N.J., assignor to Bell Telephone Laboratories, Incorporated, New York, N.Y., a corporation of New York Filed May 29, 1956, Ser. No. 588,012

9 Claims. (Cl. 340—174)

This invention relates generally to magnetic core shift register circuits and more particularly to such shift register circuits in which information stored therein may be read out and immediately restored to the particular core in which originally stored.

Magnetic cores displaying substantially rectangular hysteresis loop characteristics representative of the ability to remain in either of two conditions of magnetic saturation to which driven, have found wide application in switching and information processing systems. Because of their extreme reliability and low cost magnetic cores have been found ideally suited to specific circuit applications such as, for example, shift registers in which information in the form of remanent magnetizations of either polarity representing binary numbers may be stored or delayed.

In an illustrative magnetic core shift register of the type known in the art, two magnetic cores constitute the basic storage unit. In formation in the form of a binary "1," for example, is introduced in the register by switching the first core of the register to a state of remanent magnetization representative of a binary "1." Upon the application to this first core of a first phase advance pulse, the "1" is transferred by means of suitable coupling to the second core of the register. That is, the remanant magnetization of the first core is switched by the advance pulse to the opposite polarity, representative of a binary "0," which in turn switches the magnetic state of the second core representing a binary "0" to the opposite polarity, representing a binary "1." The first core, after the foregoing transfer, is now available for the introduction of a second information value. When this has been accomplished a second phase advance pulse is applied to the second core of the register and the "1" stored therein is transferred to the third core of the register and the second core is now available for the transfer by a second first phase advance pulse of the second information value stored in the first core.

The first and second phase advance pulses are alternately applied to corresponding cores of each basic core storage unit so that information values are simultaneously transferred from each of the cores pulsed by a phase advance pulse. Information stored in the register is thus made available at the last core of the register whenever the information values have traversed all of the cores of the register upon application of the alternate phase advance pulses.

It is evident that information introduced and stored in the register as described above, although not immediately destroyed when shifted from one core to the next succeeding core, is ultimately lost when shifted out of the last core of the register to associated utilization circuits. The information introduced in such a shift register is thus only temporarily stored, or delayed, for a period of time determined by factors such as the number of basic core storage units and the applied advance pulse rate frequency. Obviously, the information so stored may be retained by connecting the output of the register to its input and recirculating the stored information within the now reentrant shift register by continuing the application of the alternate advance pulses.

In the magnetic core shift registers heretofore known as illustrated by the register arrangement described above, it is obviously impossible to determine the nature of the information stored in the register without shifting that information one core forward along the register during the operation accomplishing the information sampling. The information stored in a particular core is thus destroyed in the act of its testing as to that particular core and is not again immediately available in that particular core.

Accordingly, it is an object of this invention to provide an improved shift register arrangement utilizing magnetic cores as information storage elements.

It is another object of this invention to accomplish the sampling of information values stored in a magnetic core shift register without at the same time shifting the stored information out of the register.

A further object of this invention is to make information stored in a magnetic core shift register available both at a serial output and parallelly at individual storage core outputs.

Still another object of this invention is to provide means whereby an information value stored in a particular storage core of a magnetic core shift register may be transferred from that core to either of two transfer cores as desired, the information value subsequently being transferable back to the particular storage core or forward to the next succeeding storage core as determined by the particular one of the two transfer cores to which the information value was transferred.

In one illustrative embodiment of this invention a pair of transfer cores is associated with each of the storage cores of the shift register. Each of the pairs of transfer cores is coupled to the storage core in a manner such that when the storage core is switched from a "1" to a "0" magnetic state by an advance pulse, both of the transfer cores may be switched from a "0" to a "1" magnetic state. However, alternate first phase advance pulse means are provided, each of which is adapted to apply an inhibiting pulse to corresponding individual ones of the transfer cores as desired simultaneously with the application of the advance pulse to the storage core with the result that the transfer of information from the storage cores is effected only to transfer cores not so inhibited. One of each pair of the transfer cores is coupled back to an input of the associated storage core with the other transfer core being coupled forward to an input of the next succeeding storage core. A second phase advance pulse now applied simultaneously to all of the transfer cores reshifts the information first shifted to either of the transfer cores by the first phase advance pulse either back to the original storage cores in which the information was stored or forward to the next succeeding storage cores as determined by the particular ones of the transfer cores to which the information was shifted by the first phase advance pulse.

An output circuit provided in connection with the last transfer core connected in a forward direction makes serially available information stored in the storage cores when particular first phase advance pulses inhibit the backwardly connected transfer cores and second phase advance pulses shift the information from the forwardly connected transfer cores to successive storage cores.

According to one aspect of this invention output circuits are provided in connection with each of the storage cores whereby information stored in any of the storage cores is available each time that a first phase advance pulse shifts the stored information from the storage cores to either ones of the transfer core pairs.

Accordingly it is a feature of this invention that the transfer core inhibiting means comprise an inhibiting winding on each of the transfer cores serially connected to pairs of advance windings on each of the storage cores in a manner such that all of the inhibit windings on the backwardly connected transfer cores are connected in series with corresponding ones of the pairs of advance windings on the storage cores and the inhibit windings on the forwardly connected transfer cores are connected in series with corresponding others of the pairs of advance windings on the storage cores. By this means first phase advance pulses applied to either of the storage core advance windings will be effective to switch any set storage cores and, in addition, will be effective to inhibit the particular transfer cores having inhibit windings connected in series with those storage core advance windings.

From the foregoing feature it is readily apparent that a further feature of this invention resides in the selective control exercisable over the direction of information shift in the register by applying first phase advance pulses to the selected ones of the pairs of storage core advance windings to determine whether the information stored in the register is to be read out or shuttled between the transfer and storage cores.

Another feature of this invention is the provision of a coupling loop including input windings of a pair of transfer cores for each storage core of the register and the output winding of the storage core whereby the switching of the magnetic state of a storage core may control the switching of the magnetic state of either of the coupled transfer cores.

According to another feature of this invention advance windings for all of the cores of the pairs of transfer cores are connected in series with the result that a single advance pulse applied to the serially connected advance windings will switch any and all of the transfer cores set by the transfer of information from the storage cores.

A complete understanding of the above and other objects and features of this invention may be gained from a consideration of the detailed description which follows when taken in conjunction with the accompanying drawing the single figure of which shows an illustrative magnetic core shift register embodying this invention. The schematic presentation employed most advantageously to depict the illustrative shift register is that known as "mirror symbols" and described by M. Karnaugh in the Proc. of the I.R.E., vol. 53, No. 5, p. 570, 572 (May 1955).

In one specific embodiment of this invention, as shown in the drawing, a series of storage cores 10, 20, and N0, are arranged each having a pair of transfer cores, such as the cores B10 and F10, associated therewith. Each storage core has provided thereon a pair of input windings, a pair of advance windings, and a pair of output windings, such as the pairs of windings 11, 12; 13, 14; and 15, 16, respectively, of the storage core 10. Each transfer core is provided with an input winding, an inhibit winding, an advance winding, and an output winding, such as the windings B11, F11; B12, F12; B13, F13; and B14, F14, of the cores B10 and F10, respectively.

Corresponding advance windings of the pairs of advance windings of the storage cores 10, 20, and N0, are connected in series with the inhibit windings of corresponding ones of the pairs of transfer cores. The advance windings 13, 23 and N3, for example, are connected in series with the inhibit windings B12, B22 and BN2, of the backward transfer cores B10, B20 and BN0, respectively, and the advance windings 14, 24 and N4, are connected in series with the inhibit windings F12, F22, and FN2, of the forward transfer cores F10, F20, and FN0, respectively. Phase $\Phi_1$ advance pulses are supplied from an external advance pulse source 30 for the former advance and inhibit windings and a second advance pulse source 40 supplies phase $\Phi_1$ advance pulses for the latter advance and inhibit windings.

The advance windings B13, F13, B23, F23, BN3 and FN3, of all of the transfer cores B10, F10, B20, F20, BN0 and FN0, respectively, are serially connected to an external phase $\Phi_2$ advance pulse source 50. Coupling loops 17, 27 and N7, including corresponding output and input windings of the storage, and backward and forward transfer cores, such as the windings 15, B11 and F11, respectively, are provided as a means for transferring information from the storage cores to either ones of the pairs of transfer cores. Coupling loops 18, 28 and N8 include the output windings B14, B24 and BN4, of the backward transfer cores and the input windings 11, 21 and N1, of the preceding storage cores 10, 20 and N0, respectively, as shown in the drawing. Each of the forward transfer cores F10 and F20 is coupled by means of the coupling loops 19 and 29, respectively, to a succeeding storage core, the coupling loops 19 and 29 including, respectively, the output and input windings F14 and 22, and F24 and N2, of the transfer and storage cores F10 and 20, and F20 and N0. The initial storage core 10 of the shift register is connected by means of its input winding 12 to an external information source 60 and the final forward transfer core FN0 is connected by means of its output winding FN4 to an information output circuit means 70 wherein the stored information is to be used.

An output circuit 32 having signal utilization means or load included therein represented by the resistance 33 may be connected to each of the storage cores 10, 20 and N0, by means of the final output windings 16, 26 and N6, respectively. Unidirectional current elements such as the diodes 31 are included in each of the coupling circuits and the output circuits to permit only current induced by the resetting of a switched core to flow either to set a connecting core or to provide proper directional current to represent an information value read out by an advance pulse.

In the shift register of the present invention the information stored therein appears as a pattern of "1's" and "0's" in the storage cores 10, 20 and N0. In describing the operation of the present invention, however, it will be assumed that only the first storage core 10 has a "1" stored therein, that is, only the storage core 10 will be magnetized in an upward direction as seen in the drawing. Generally, the principle of operation of the register is to shift an information value, that is, a "1," out of a storage core into a forward transfer core if the information is to be shifted serially along the register or, if the information is to be sampled and returned to the same storage core in which originally stored, into a backward transfer core. When the transfer cores into either of which an information value has been shifted is reset by an advance pulse, the "1's" contained therein are transferred either into the next succeeding storage core or back into the storage core out of which originally transferred.

More specifically, assuming as above that a "1" is stored in the storage core 10 shown in the drawing and assuming further that it is desired to shift this information bit forward along the register, a phase $\Phi_1$ advance pulse is applied from the advance pulse source 30 to the storage core advance windings including the winding 13. The advance pulse will cause the set core 10 to be reset to its "0" condition. As a result current will flow in the coupling loop 17 including the input windings B11 and F11 thereby tending to set both of the associated transfer cores B10 and F10 to the "1" condition. However, as is evident in the drawing, the advance pulse from the source 30 is also applied to the inhibit winding B12 of the backward transfer core B10 with the result that the advance pulse effectively prevents the backward transfer core B10 from setting, and the "1" originally stored in the storage core 10 is shifted by means of the coupling loop 17 only to the forward transfer core F10. By a suitable selection of turns ratio of the windings B12 and B11 the $\Phi_1$ advance pulse in the inhibit winding B12 can readily be made to oppose the switching action of the induced current in the input winding B11. A $\Phi_2$ advance pulse supplied by advance pulse source 50 may now be applied to all of the serially connected advance windings of the transfer cores to effect the resetting of any of the transfer cores set by a $\Phi_1$ advance pulse. The transfer core F10 having the "1" originally stored in the storage core 10 therein will now be reset causing a current flow in the coupling loop 19 including the input winding 22 with the result that the next succeeding storage core 20 presently having a "0" contained therein is now set to represent the information value "1."

Thus, as described above, it is evident that by selecting the proper one of either of the two phase $\Phi_1$ advance pulses and by the subsequent application of the phase $\Phi_2$ advance pulse, the information will be shifted from the storage core 10 to the next succeeding storage core 20 in a manner analogous to that of prior known two-core-per-bit shift registers. By the successive application of phase $\Phi_1$ advance pulses from the source 30 followed by the alternate application of phase $\Phi_2$ advance pulses from the source 50 the information value "1" originally stored in the storage core 10 may be stepped along the shift register until it finally appears in the final forward transfer core FN0 at which point, upon the application of a final phase $\Phi_2$ advance pulse, the information is made available to the information output circuit means 70 by means of the output winding FN4.

Should it be desired, on the other hand, that the information contents of the shift register be merely sampled and retained in the same storage cores in which originally stored, $\Phi_1$ advance pulses supplied by the advance pulse source 40 are applied to the advance winding 14 of the storage core 10 rather than the phase $\Phi_1$ advance pulse supplied by the advance pulse source 30. Assuming again the presence of an information value "1" in the storage core 10, when a $\Phi_1$ advance pulse from the advance pulse source 40 is applied through the winding 14 a current will be induced in the coupling loop 17 including the input windings B11 and F11 which current again tends to set the transfer cores B10 and F10. In this case, however, the advance current flows through the advance winding 14 and the inhibit winding F12 and now the forward transfer core F10 will be effectively prevented from switching. Because of the current flow in the input winding B11 of the backward transfer core B10, the latter core will be set and the information will now have been transferred from the storage core 10 to the backward transfer core B10.

Resetting of the storage core 10 by the $\Phi_1$ advance pulse from the source 40 will also have caused a current to be induced in the output winding 16 and the circuit 32 whereby the "1" condition, will have been available for detection. Upon the application of the phase $\Phi_2$ advance pulse from the advance pulse source 50 to the advance windings of the transfer cores, the backward transfer core B10 will be reset thereby inducing a current in the coupling loop 18 including the input winding 11 with the result that the storage core 10 will again be set and the information transferred back to the storage core in which it was originally present. It is to be understood that this operation is accomplished simultaneously in all of the storage and transfer cores as is evident from the fact that the advance windings of these two groups of cores are connected in series as shown in the drawing. Current will, therefore, be induced in each of the output circuits 32 connected to storage cores in which an information value "1" was present at the time of the sampling operation.

Problems of stray coupling and spurious transfer of information between cores may be encountered in placing in operation of a shift register according to the present invention. These problems, however, are readily solved by an expedient well known in the magnetic core art, that is, by a suitable selection of turns ratios of the windings of the cores in question. When, for example, a storage core is reset a current is induced in the coupling loop 18 in the forward direction of the diode 31 whether it is a $\Phi_1$ advance pulse from the source 30 or from the source 40. This current induced in the coupling loop 18 will be in a direction such as to set the associated backward transfer core. In the case of the application of a $\Phi_1$ advance pulse from the source 40, this will present no particular problem since the selection of the source 40 determines that the backward transfer core was the transfer core to which the information was to be transferred. In the case of the $\Phi_1$ advance pulse applied by the source 30, however, it is evident from the foregoing description that the information is to be shifted to the forward and not the backward transfer core and the backward transfer core must be prevented from switching. In operation, in the latter case, the advance current flowing in the inhibit winding of the backward transfer core must be sufficient to counteract the switching effect of the currents induced in both of the coupling loops 17 and 18 by the resetting of the storage core by the advance current.

In addition, when a $\Phi_2$ advance pulse is applied from the source 50 to the advance windings of the transfer cores, whichever of the transfer cores is set will be switched with the result that a current in the forward direction of the diode 31 will be induced in the coupling loop 17. This induced current will tend to set both the preceding storage core and the transfer core not set to a "1" condition. In the case of the latter transfer core this tendency will be effectively counteracted by the inhibiting effect of the $\Phi_2$ advance current flowing in the serially connected advance winding of that core.

In any case where an advance current cannot be utilized to provide an inhibiting effect backward transfer of information may be readily counteracted by a suitable choice of turns ratio of the windings of the cores in question.

Reference is made to application Serial No. 588,011, filed May 29, 1956, of F. T. Andrews, Jr., wherein a related invention is disclosed and claimed.

It is to be understood that what has been described is but one illustrative embodiment of the present invention and that other arrangements embodying the principles of this invention may be devised by one skilled in the art without departing from its spirit and scope.

What is claimed is:

1. A shift register circuit comprising a first, second and third plurality of magnetic cores, each of said cores being capable of assuming bistable states of magnetic remanence, a pair of advance windings for each of said first plurality of cores, corresponding ones of said advance windings being serially connected, advance windings for each of said second and third plurality of cores, said last-mentioned windings being serially connected, an inhibit winding for each of said second and third plurality of cores, said inhibit windings of said second plurality of cores being serially connected with corresponding ones of said advance windings of said first plurality of cores and said inhibit windings of said third plurality of cores being serially connected with corresponding others of said advance windings of said first plurality of cores, means for individually coupling said first plurality of cores with corresponding ones of said second and third plurality of cores, means for individually coupling said first plurality of cores with corresponding ones of said second plurality of cores, and means for individually coupling said third plurality of cores with corresponding ones of said first plurality of cores.

2. A shift register circuit as claimed in claim 1, also comprising an output winding for each of said first plurality of cores, and individual output circuit means connected to each of said output windings.

3. A shift register circuit as claimed in claim 2, also comprising an output winding for the last core of said third plurality of cores, and an output circuit means connected to said last-mentioned output winding.

4. A shift register circuit comprising a plurality of storage cores each having input, output and advance windings thereon, a pair of transfer cores associated with each of said storage cores, said transfer cores having input, output and advance windings thereon, each of said storage and transfer cores being capable of assuming bistable states of magnetic remanence, means for connecting an output winding of each of said storage cores to an input winding of each core of its associated pair of transfer cores, means for connecting an output winding of each of corresponding ones of said transfer cores only to a corresponding input winding of its associated storage core, means for connecting an output winding of each of the corresponding others of said transfer cores only to a corresponding input winding of a succeeding storage core, means including said storage core advance windings for applying advance pulses to said storage cores, means including said transfer core advance windings for applying advance pulses to said transfer cores, and means for applying inhibiting pulses to predetermined corresponding ones of said pairs of transfer cores simultaneously with said advance pulses on said storage cores.

5. A magnetic core shift register circuit comprising a plurality of storage cores each having a pair of input windings thereon, a first transfer core and a second transfer core associated with each of said storage cores, each having an output winding and an advance winding thereon, each of said storage cores and said transfer cores being capable of assuming bistable states of magnetic remanence, means for connecting the output winding of each of said first transfer cores respectively only to one input winding of a corresponding one of said associated storage cores, means for connecting the output winding of each of said second transfer cores respectively only to another input winding of said corresponding one of said storage cores, and means including said advance windings and a source of advance pulses for selectively shifting information from a first transfer core to its associated storage core and from a second transfer core to said last-mentioned storage core.

6. A magnetic core shift register circuit comprising a plurality of storage cores, a first and a second advance winding on each of said storage cores, a first plurality of transfer cores each having an inhibit winding thereon, a second plurality of transfer cores each having an inhibit winding thereon, each of said storage cores and said transfer cores having substantially rectangular hysteresis characteristics, the inhibit windings of said first plurality of transfer cores being connected to said first advance windings and the inhibit windings of said second plurality of transfer cores being connected to said second advance windings, first means for coupling each of said storage cores to corresponding ones of said first and said second plurality of transfer cores, second means for coupling each of said storage cores to corresponding ones of only said first plurality of transfer cores, and third means for coupling each of said storage cores to corresponding ones of only said second plurality of transfer cores.

7. A magnetic core shift register stage comprising a storage core having a first and a second advance winding thereon, a first and a second input winding thereon, and an output winding, a first transfer core having an input, output, advance, and inhibit winding thereon, a second transfer core having an input, output, advance and inhibit winding thereon, each of said storage and transfer cores having a substantially rectangular hysteresis characteristic, means connecting said storage core first advance winding to said first transfer core inhibit winding, means connecting said storage core second advance winding to said second transfer core inhibit winding, means connecting said storage core output winding to said first and second transfer core input winding, means connecting said second transfer core output winding only to said storage core first input winding, means applying pulses to said storage core second input winding, means for receiving pulses from said first storage core output winding, and means for applying pulses to said transfer core advance windings in series.

8. A magnetic core shift register comprising a plurality of storage cores, a first and a second plurality of transfer cores, each of said cores having a substantially rectangular hysteresis characteristic and each of said cores having input, output, and advance windings thereon, means for connecting an output winding of each of said first plurality of transfer cores respectively to an input winding of a corresponding one of said storage cores, means for also connecting an output winding of each of said second plurality of transfer cores respectively to another input winding of said corresponding one of said storage cores, means for applying first advance pulses to said advance windings of said plurality of storage cores, means for applying second advance pulses to said advance windings of said first and second plurality of transfer cores alternately with said first advance pulses, and inhibiting means for selectively inhibiting either said first or said second plurality of transfer cores simultaneously with said first advance pulse.

9. A magnetic core shift register according to claim 8 in which said inhibiting means comprises an inhibit winding for each of said first and second plurality of transfer cores, and circuit means for applying said first advance pulse to the inhibit windings of either said first or said second plurality of transfer cores.

References Cited in the file of this patent

UNITED STATES PATENTS

| | | |
|---|---|---|
| 2,673,337 | Avery | Mar. 23, 1954 |
| 2,695,993 | Haynes | Nov. 30, 1954 |
| 2,708,722 | An Wang | May 17, 1955 |
| 2,768,312 | Goodale et al. | Oct. 23, 1956 |
| 2,805,409 | Mader | Sept. 3, 1957 |